Figure 1:
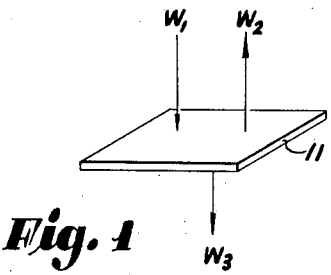

Dec. 25, 1962  D. R. KERSTETTER  3,069,893
THERMAL EMISSIVITY DEVICE
Filed Aug. 8, 1958

INVENTOR
DONALD R. KERSTETTER
BY
Robert E. Strauss
ATTORNEY

United States Patent Office 3,069,893
Patented Dec. 25, 1962

---

3,069,893
THERMAL EMISSIVITY DEVICE
Donald R. Kerstetter, Emporium, Pa., assignor, by mesne assignments, to Sylvania Electric Products Inc., Wilmington, Del., a corporation of Delaware
Filed Aug. 8, 1958, Ser. No. 754,003
3 Claims. (Cl. 73—15)

This invention relates to an apparatus adapted to be utilized in determining the thermal emissivity of materials and to the method of obtaining the parameters used in the determination of thermal emissivity.

In the fabrication of many devices and machines, the thermal emissivity of the various parts is often a very important factor. One class of devices which requires that the parts or elements thereof have high thermal emissivity includes electron discharge devices or tubes. Certain tube components such as anodes and grids, which undergo electron bombardment, have a tendency to operate at undesirably high temperatures. Proper control of the tube component temperatures assures reliability and sustained life of these devices by controlling the evolution of gas from the parts, the operating temperatures of the components, secondary emission of the elements and the poisonous effects of re-evaporization or volatilization of sublimating materials collected on the components during tube processing.

In order to assure the adoption of proper materials for the various tube elements in accordance with required operating temperatures, it is necesary to select materials or compositions having a prescribed thermal emissivity. Heretofore, the manner of making this selection has been unweildly and complex. Elaborate equipment has been used for measuring total input wattage to a sample and then measuring the equilibrium temperature of the sample. However, the technique for eliminating end losses of the sample, for controlling and obtaining temperature measurements, and for maintaining and determining environmental conditions was quite complicated. Further, such a process and apparatus invariably determines the combined thermal emissivity of both major surfaces of the material and are not capable of measuring thermal emissivity of one major surface only.

Accordingly, an object of the invention is to reduce the aforementioned disadvantages and to accurately and efficiently obtain the thermal emissivity of a material.

A further object is to determine thermal emissivity of a material by means of a simple and inexpensive apparatus and process.

A still further object is to determine selectively the thermal emissivity of one or more major surfaces of a material.

In accordance with one aspect of the invention, an apparatus is provided with a chamber for housing the material to be tested, heat generating means for radiating heat to the material, means for measuring the temperature of the material, and means for measuring the ambient temperature of the atmosphere in the vicinity of the material. During the process of determining thermal emissivity parameters, a calibrating sample of material is connected to a temperature measuring instrument such as a thermocouple, and the calibrating sample is then blackened on both sides and placed in the chamber. Subsequently, heat is applied to the calibrating sample, and the sample and ambient temperatures are recorded. A test sample is then connected to the thermocouple, blackened on one side, and heated to the same ambient temperature as the calibrating sample. The temperature of the test sample is then obtained and can be applied to the equation:

$$e = \frac{2(T_1^4 - T_0^4) - (T_2^4 - T_0^4)}{(T_2^4 - T_0^4)}$$

where:
$e$ = thermal emissivity
$T_1$ = temperature of calibrating sample
$T_2$ = temperature of test sample
$T_0$ = ambient temperature in vicinity of test and calibrating samples.

Alternatively, a graph showing thermal emissivity vs. temperature of the test material may be calculated to give a thermal emissivity reading when the test sample temperature is obtained. Also a recorder may be employed, if desired, which will give a direct reading of thermal emissivity.

Figure 2:
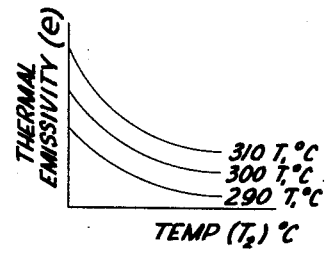
Figure 3:
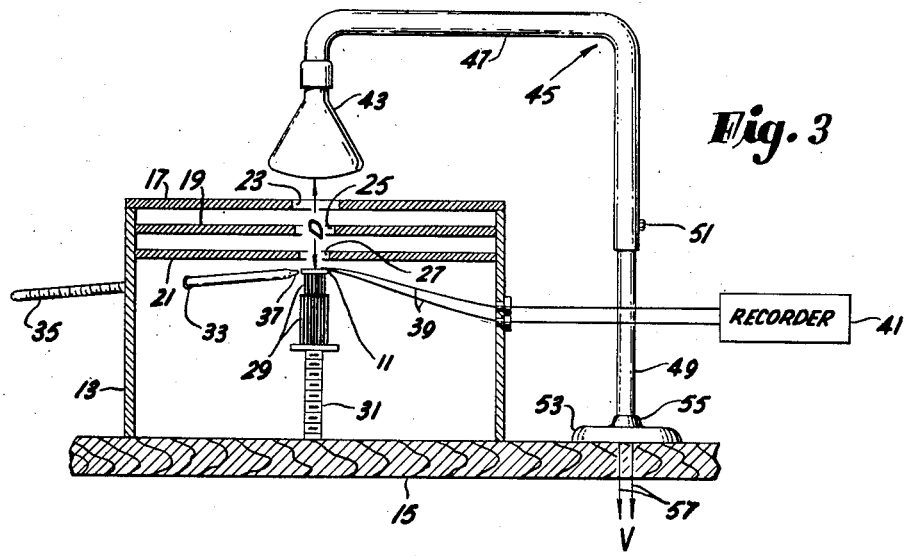
Figure 4:
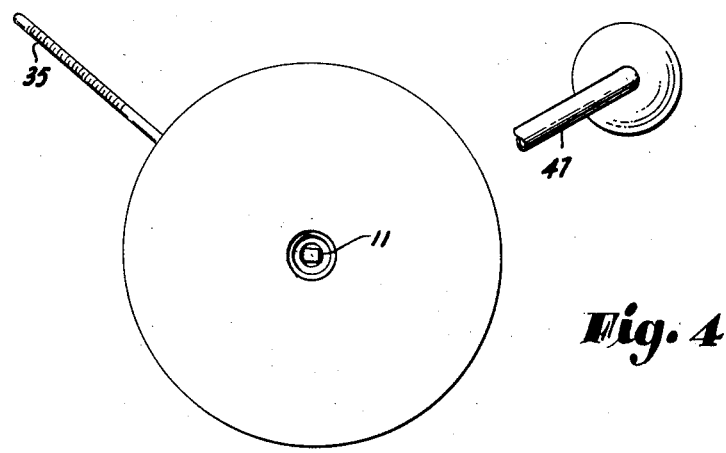

For a better understanding of the invention, reference is made to the following description taken in conjunction with the accompanying drawings in which:

FIG. 1 illustrates the heat radiated to and from a sample of material;
FIG. 2 is a graph showing the relationship between thermal emissivity and the temperature of the test sample as calculated from the above equation;
FIG. 3 is a side elevation view of the test apparatus; and
FIG. 4 is a top view of the apparatus shown in FIG. 3.

Referring to FIG. 1, a calibrating sample 11 of a material which is to be tested for thermal emissivity is shown receiving $W_1$ watts radiation from a heat source. When the equalibrium temperature of sample 11 is reached, the watts input $W_1$ are equal to the watts $W_2$ radiated from the upper surface of the sample plus the watts $W_3$ radiated from the lower surface, assuming edge losses to be negligible. Since the top and botom surfaces of calibrating sample 11 are, for purposes of testing, large or major surfaces, the heat radiation from the edges of the material is insignificant.

Stefan-Boltzmann's law of radiation is as follows:

(1) $$W = K(T_1^4 - T_0^4)$$

where:
$W$ = Watts radiation from the sample
$T_1$ = temperature in degrees Kelvin of the calibrating sample
$T_0$ = temperature in degrees Kelvin of the environment
$K = C$(Constant) $\times e$ (thermal emissivity) $\times A$ (Area).

It is to be noted that K includes both the area and thermal emissivity of the plate. Assuming that both the top and bottom or major surfaces of the calibrating sample 11 are blackened so that the sample becomes a true "black body" with a thermal emissivity of 1, a substitution of Stefan-Boltzmann's Equation 1 in the equilibrium equation (2) $$W_1 = W_2 + W_3$$

provides;

(3)  $W_1 = CA_T(T_1^4 - T_0^4) + CA_B(T_1^4 - T_0^4)$

Since the top and bottom surfaces $A_T$ and $A_B$ respectively, are equal, the equation resolves as follows:

(4)  $W_1 = 2CA(T_1^4 - T_0^4)$

Now, if another sample 11 which is identical to the sample described above and will be called the test sample, is blackened on the top side only, and the same amount of watts $W_1$ are radiated to the blackened surface, this sample will, for all practical purposes, absorb all of the heat energy radiated to it and it will reach an equilibrium temperature. However, this temperature will be higher than the calibrating sample due to the fact that the bottom surface of the sample has not been blackened.

Again applying the equations (2)  $W_1 = W_2 + W_3$ and (1)  $W = K(T_1^4 - T_0^4)$ the test sample formula can be written as follows where the blackened top surface has an assumed thermal emissivity of unity:

(5)  $W_1 = CA_T(T_2^4 - T_0^4) + (e)CA_B(T_2^4 - T_0^4)$ where:
$e$ = thermal emissivity of the bottom side.
$T_2$ = temperature in degrees Kelvin of the test sample.
$W_1$ = the energy being received by the sample.

Since the energy $W_1$ received by the calibrating sample, Equation 4, is the same as the energy $W_1$ received by the test sample, Equation 5, the relationship may be expressed as follows with the top and bottom surface area, $A_T$ and $A_B$ respectively being equal:

(6)  $2CA(T_1^4 - T_0^4) = CA(T_2^4 - T_0^4) + (e)CA(T_2^4 - T_0^4)$

Solving for thermal emissivity $(e)$, the following equation is obtained:

(7)  $e = \dfrac{2(T_1^4 - T_0^4) - (T_2^4 - T_0^4)}{(T_2^4 - T_0^4)}$

The above formula presents a simplified expression for determining the thermal emissivity of a given material. If the heat $W_1$ radiated to both the calibrating sample and the test sample are the same, and if the temperature $T_1$ of the calibrating sample and the ambient temperature $T_0$ for both samples is made constant, a series of values for thermal emissivity can be determined from Equation 7 above. These values will provide a universal thermal emissivity $(e)$ versus $T_2$ curve as shown in FIG. 2 for any number of predetermined temperatures $T_1$. Therefore, when the temperature $T_2$ of the test sample is obtained, the thermal emissivity of the test material can be read directly from the curve.

Instead of using a graph such as is shown in FIG. 2, the instrument measuring $T_2$ may form part of or be connected to a device providing a direct thermal emissivity recording as will be hereafter described.

The apparatus for obtaining thermal emissivity parameters is shown in FIGS. 3 and 4 comprising a chamber 13 for housing the material sample 11 positioned on a low heat conductive or wooden base 15. This chamber is formed from a metal such as chrome plated steel or aluminum and is highly polished so that it exhibits excellent heat reflective properties. The upper portion of chamber 13 is provided with spaced top plates 17, 19 and 21, each formed with successively smaller diameter apertures 23, 25 and 27 respectively. The diameter of aperture 27 is only slightly larger than the exposed surface area of sample 11.

The high heat reflective properties of chamber 13 prevents heating of the chamber interior and the plates 17, 19 and 21 with their pre-selected aperture sizes prevents movement of air with its accompanying variable cooling effects on the sample. Although three plates have been shown, it is to be understood that more or less plates can be used, if desired.

Sample 11 is supported adjacent plate 21 and in alignment with aperture 27 by means of a plurality of support wires 29 welded or otherwise connected together. These wires are made from a low thermal conductivity metal such as an iron-nickel alloy. A low thermal conductivity support rod 31, adjustable in height, is used to hold support wires 29 and the sample in position.

A small aperture 33 is formed in the side of chamber 13 to allow passage therethrough of a temperature sensitive device or mercury thermometer 35. The bulb portion 37 is positioned close to sample 11 but not exposed to radiation from the heat lamp so that the ambient temperature can be measured.

A pair of fine gauge thermocouple wires 39 having a juncture welded to sample 11 extends through the side of housing 13 and to a thermocouple instrument or recorder 41 formed to indicate the temperature or thermal emissivity of the sample. The voltage developed across the thermocouple wires when sample 11 is heated may be converted into a temperature recording for application to the graph of FIG. 2. Alternatively or in supplement thereto, this voltage may be used to actuate an indicator movable over a scale calibrated in accordance with the curves of FIG. 2 to provide a direct reading of thermal emissivity.

The heat is supplied to sample 11 by means of a heat generator or lamp 43 mounted above the apertures in housing 13. The support bracket 45 for lamp 43 comprises a substantially L-shaped tube 47 telescoped over tube 49. Heat lamp 43 may be raised or lowered by adjustment of the telescoping relationships of the tubes through manipulation of set screw 51. Also the assembly comprising heat lamp 43 and tubes 47 and 49 may be rotated about base 53 by means of coupling 55. Leads 57, which pass through the tubes 47 and 49 to lamp 43, are connected to a variable voltage supply V. Therefore, the heat supplied to sample 11 can be varied by adjusting the spacing D between the lamp and sample and by adjusting the power input from the electrical supply V.

In order to determine the thermal emissivity of a given material, a calibrating sample 11 of the material is first cut, and the junction of the thermocouple wires 39 is welded to the sample. Both sides of the calibrating sample are then blackened by any convenient means such as a carbon flame and the sample is placed upon support wires 29. With housing 13 in position, the sample is in alignment with apertures 23, 25 and 27. Thermometer 35 and a lamp 43 are then positioned so that the unit is in readiness for calibration. Lamp 43 is energized to radiate heat to the calibrating sample. Utilizing approximately 250 watts with a relatively small distance D causes the calibrating sample to approach equilibrium temperature in about 30 seconds. Heat may be continuously applied until the ambient temperature $T_0$ reaches 43.2° C. for convenience of calculation. At this time, the calibrating sample temperature $T_1$ is read on a temperature scale on thermocouple or recorder 41. When the graph shown in FIG. 2 is used, the power input to lamp 43 and the distance D may be regulated so that the sample temperature $T_1$ may be approximately at a calibrating curve base, e.g. 300° C. curve, when $T_0$ is at 43.2° C. Accordingly, the 300° C. temperature $T_1$ curve may then serve as the basis for obtaining thermal emissivity of the test sample as will be explained below.

Housing 13 may be removed and the thermocouple wires 39 disconnected from the calibrating sample. A test sample of the material having the same cross sectional area as the calibrating sample is then welded to the thermocouple wires and blackened on one side only. The sample is placed upon supports 29 so that the blackened surface faces heat lamp 43. After placing housing 13 over the sample, and with all of the components in position, the lamp is energized to radiate heat to the blackened surface of the test sample. The distance D and the power input into lamp 43 should be the same as when the calibrating sample resulted were obtained. When the reading on thermometer 35 reaches the same ambient temperature $T_0$, e.g. 43.2° C., as it was for the calibrating sample, the temperature $T_2$ of the test sample is read on the temperature scale of recorder 41. With this information, it is then possible to obtain the thermal emissivity of the sample material by reading it at the point on the calibrating curve, e.g. 300° C. $T_1$ curve, which is intersected by the recorded temperature $T_2$, FIG. 2. This entire operation takes only several minutes to perform.

It can be seen that this invention provides an easy and accurate means for determining thermal emissivity of a material. If desired, the parameters obtained in the procedure may be equated directly from the formula:

$$e = \frac{2(T_1^4 - T_0^4) - (T_2^4 - T_0^4)}{(T_2^4 - T_0^4)}$$

Alternatively, substituting a given value for $T_0$, e.g. 43.2° C., a given value $T_1$, e.g. 300° C. as constants in the above equation, and substituting a plurality of values for $T_2$, curves such as are shown in FIG. 2 can be obtained. Then, during testing, the value of thermal emissivity can be read directly from the graph after establishing the curve base $T_1$ temperature and after reading $T_2$.

As pointed out above, recorder 41 may be provided with a scale formed in accordance with the curves shown in FIG. 2. Therefore, the thermal emissivity of the material may be read directly from the proper scale on the recorder.

Thermal emissivity readings obtained with the process and apparatus described herein has been found to be accurate within ±one percent. The time needed to perform the operation is relatively short and the equipment is inexpensive. In addition, the thermal emissivity of one side of a material can be selectively obtained, if desired. This is advantageous where parts having different types of surfaces are being considered.

It is to be noted that the test samples have been illustrated as having large top and bottom surface areas and relatively small sides. The percentage error in obtaining thermal emissivity of a material having large end or side surfaces relative to the major surfaces increases to some extent.

It has been found thta an air atmosphere within housing 13 is acceptable so long as the sample temperature is kept under 350° C. If this temperature is raised above that value, it is preferable to use a non-oxidizing atmosphere.

Although several embodiments of the invention have been shown and described, it will be apparent to those skilled in the art that various changes and modifications may be made therein without departing from the scope of the invention as defined by the appended claims.

What is claimed is:

1. An apparatus for obtaining parameters utilized in the determination of thermal emissivity of an article having a given size comprising a low heat conductive base, a chamber for housing the article removably mounted upon said base, said chamber having an end plate formed with an aperture having a size approximating said given article size and internal heat reflective walls, an adjustable low heat conductive support mounted upon said base for removably holding the article within said chamber at a position spaced from the end plate and in alignment with said chamber plate aperture, a heat lamp mounted exterior to said chamber having means for adjusting the spacing relative to the end plate aperture and formed to radiate heat to said article through said aperture, a thermocouple positioned within the chamber formed for connection with said article for measuring the temperature thereof, and a thermometer positioned within the chamber adjacent the article for measuring the ambient temperature in the vicinity of said article.

2. A process for determining thermal emissivity parameters of a test sample of material having large preselected top and bottom surface areas relative to the sides in accordance with the equation:

$$e = \frac{2(T_1^4 - T_0^4) - (T_2^4 - T_0^4)}{(T_2^4 - T_0^4)}$$

where:

$e$ = thermal emissivity
$T_1$ = temperature of calibrating sample
$T_2$ = temperature of test sample
$T_0$ = ambient temperature in vicinity of test and calibrating samples, said process comprising the steps of blackening both large surfaces of a calibrating sample having surface areas equal to said preselected test sample surface areas, applying a prescribed amount of heat to the calibrating sample to raise said calibrating sample to the temperature $T_1$ and the atmosphere adjacent the calibrating sample to the temperature $T_0$, blackening one of the large preselected surface areas of the test sample, applying said prescribed amount of heat to the blackened surface of said test sample for a period of time sufficient to raise the atmosphere adjacent said test sample to the temperature $T_0$, and registering the temperature $T_2$ of said test sample.

3. A process for determining the thermal emissivity parameters of a test sample of material having large top and bottom surface areas relative to the sides based upon a calibrating sample of material having the same top and bottom surface areas as said test sample in accordance with the equation:

$$e = \frac{2(T_1^4 - T_0^4) - (T_2^4 - T_0^4)}{(T_2^4 - T_0^4)}$$

where:

$e$ = thermal emissivity
$T_1$ = temperature of calibrating sample
$T_2$ = temperature of test sample
$T_0$ = ambient temperature in vicinity of test and calibrating samples, said process comprising the steps of attaching a thermocouple to one large surface of the calibrating sample, blackening both large surfaces of the calibrating sample, applying a prescribed amount of heat to the calibrating sample to raise said calibrating sample to the temperature $T_1$ and the atmosphere adjacent the calibrating sample to the temperature $T_0$, attaching a thermocouple to one large surface of the test sample, blackening the test sample surface to which the thermocouple is attached, applying said prescribed amount of heat to the test sample for a period of time sufficient to raise the atmosphere adjacent said test sample to the temperature $T_0$, and registering the temperature $T_2$ of said test sample.

References Cited in the file of this patent

UNITED STATES PATENTS

| | | |
|---|---|---|
| Re. 19,564 | Quereau | May 7, 1935 |
| 2,707,881 | Gier et al. | May 10, 1955 |
| 2,921,972 | Kreisler et al. | Jan. 19, 1960 |